(12) United States Patent
Li et al.

(10) Patent No.: US 8,222,925 B2
(45) Date of Patent: Jul. 17, 2012

(54) MULTIMODE ETHERNET LINE DRIVER

(75) Inventors: Hsin-Hsien Li, Hsin Chu (TW);
Chin-Chun Lin, Hsin Chu (TW);
Tsung-Hsien Hsieh, Hsin Chu (TW);
Zi-Long Huang, Hsin Chu (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 521 days.

(21) Appl. No.: 12/569,115

(22) Filed: Sep. 29, 2009

(65) Prior Publication Data

US 2011/0075741 A1    Mar. 31, 2011

(51) Int. Cl.
*H03K 19/094* (2006.01)
*H03K 19/0175* (2006.01)
(52) U.S. Cl. .............................. 326/86; 326/82; 326/90
(58) Field of Classification Search .................. None
See application file for complete search history.

(56) References Cited

U.S. PATENT DOCUMENTS

| 6,665,347 B2 * | 12/2003 | van Bavel et al. ............ 375/257 |
| 6,919,742 B1 * | 7/2005 | McGlinchey ................. 327/108 |
| 2009/0212829 A1 | 8/2009 | Kan et al. |

* cited by examiner

*Primary Examiner* — Anh Tran
(74) *Attorney, Agent, or Firm* — Winston Hsu; Scott Margo (57) ABSTRACT

A multimode line driver circuit is provided. The multimode line driver circuit has a first driver circuit for receiving a first differential input signal and transmitting a first differential output signal, and a second driver circuit for receiving a second driver circuit for receiving a second differential input signal and transmitting a second differential output signal. The multimode line driver circuit also has a first switch coupling the first driver circuit to a first power supply and a second switch coupling the second driver circuit to a second power supply. The multimode line driver circuit also has a transformer coupled to the output interface for transforming the first differential output and the second differential output and a mode controller configured to close the first switch in the first mode and to close the second switch in the second mode.

20 Claims, 4 Drawing Sheets

MULTIMODE ETHERNET LINE DRIVER

TECHNICAL FIELD

The disclosure relates generally to line driver circuits and, in particular, to line driver circuits applicable as multimode Ethernet line drivers.

BACKGROUND

A network is a collection of interconnected nodes that exchange information. The network may be configured as a local-area network ("LAN") or a wide-area network, such as the Internet. Each network node may be a computer or another device configured to communicate with other nodes on the network. Network nodes typically communicate with one another by exchanging information according to predetermined network communication protocols, or sets of rules defining how information is exchanged between network nodes.

Ethernet is a common network communication protocol used in LANs. One example of Ethernet protocol is set forth in the publicly-available Institute of Electrical and Electronics Engineers ("IEEE") Standard 802.3, entitled "Carrier Sense Multiple Access With Collision Detection (CSMA/CD) Access Method and Physical Layer Specifications." The IEEE Standard 802.3 includes, among other things, rules for Ethernet data packet formatting, for different baseband data rates, and for physical transmission media to be used for transmitting Ethernet data packets between network nodes.

As used herein, an "Ethernet mode" is defined as a particular combination of a baseband data rate (i.e., without modulation) and a physical transmission medium. The IEEE Standard 802.3 describes various Ethernet modes including 10BASE-T ("Ethernet"), 100BASE-TX ("Fast Ethernet"), and 1000BASE-T ("Gigabit Ethernet"). 10BASE-T supports baseband Ethernet data transmissions up to 10 megabits per second ("Mbps") over twisted-pair cables; 100BASE-TX supports baseband transmissions up to 100 Mbps over twisted-pair cables; and 1000BASE-T supports baseband transmissions up to 1 gigabit per second (1000 Mbps) over twisted-pair cables. While 10BASE-T, 100BASE-TX, and 1000BASE-T are popular Ethernet modes in modern LAN architectures, it is apparent that other Ethernet modes can be employed. Accordingly, the 10BASE-T, 100BASE-TX, and 1000BASE-T Ethernet modes are discussed herein by way of example and are not intended to limiting in any manner.

In practice, 10BASE-T and 100BASE-TX LAN connections are typically deployed over a conventional Category-5 cable ("CAT5") having four pairs of unshielded twisted copper wires. 1000BASE-T connections, however, typically use an enhanced Category-5 cable, or "Category-5e," cable. Both Category-5 and Category-5e cables typically have 100 ohm impedances and thus require 100 ohm terminations to prevent signal reflections. As used herein, "Category-5 cable" and "CAT5 cable" generally refer to any cable that exhibits the electrical characteristics of a conventional Category-5 or Category-5e cable.

A network node typically includes a network interface card ("NIC") adapted to transmit and/or receive data. An NIC may contain hardware and software drivers for transmitting data using a selected Ethernet mode. To that end, the NIC may employ line driver circuitry to transmit and/or receive Ethernet data over a physical transmission medium, such as a Category-5 cable.

Figure 1:
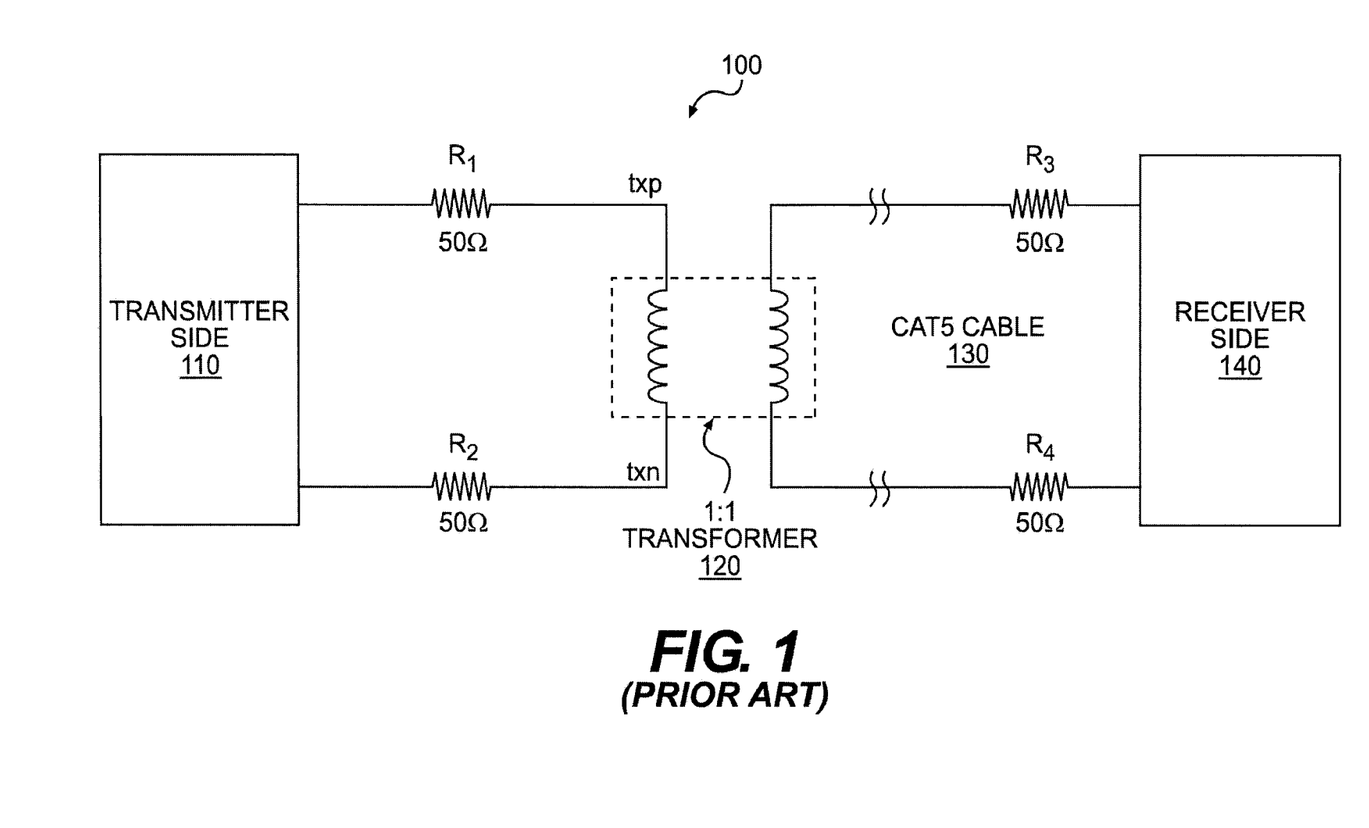
FIG. 1 illustrates a schematic block diagram of a prior art Ethernet connection.

FIG. 1 illustrates a schematic block diagram of an exemplary Ethernet connection ("link") 100 having a transmitter side 110 and a receiver side 140 interconnected via a Category-5 cable 130. Transmitter side 110 includes line driver circuitry (e.g., in a first NIC, which may include transmitter side 110 and transformer 120) configured to transmit Ethernet data over cable 130 to receiver side 140 (e.g., in a second NIC, which may include receiver side 140). Transmitter side 110 is coupled to cable 130 and to receiver side 140 via a transformer 120 having a one-to-one turns ratio (1:1). Signals transmitted from transmitter side 110 are coupled through transformer 120 and sent to receiver side 140. The line driver circuitry of transmitter side 110 also includes a pair of 50Ω resistors $R_1$ and $R_2$ that are impedance-matched with effective 50Ω resistances $R_3$ and $R_4$ exhibited by Category-5 cable 130.

The exemplary line driver circuitry shown in FIG. 1 transmits Ethernet data as a differential output signal having a positive output voltage txp and a negative output voltage txn. The resulting Ethernet signal is therefore the difference between positive output voltage txp and negative output voltage txn (i.e., txp-txn). In 10BASE-T Ethernet mode, the positive output voltage txp is typically about 2.2 Volts peak-to-peak (Vpp), and the resulting differential output signal (i.e., txp-txn) is therefore typically greater than 4.4 Vpp.

100BASE-TX and 1000BASE-T modes, however, typically use a lower amplitude differential output signal. In particular, 100BASE-TX and 1000BASE-T modes have a positive output voltage txp and a negative output voltage txn of about 1 Vpp, resulting in a differential output signal of about 2 Vpp. While the 100BASE-TX and 1000BASE-T output signals typically have similar peak-to-peak voltage swings, the IEEE Standard 802.3 specifies that the 1000BASE-T output signal, unlike the 100BASE-TX signal, is encoded using five-level pulse-amplitude modulation for better bandwidth utilization.

Because different networks may employ different Ethernet modes while relying on the same cable for data transmissions, it may be desirable for a NIC to be compatible with multiple Ethernet modes. For example, a device may initially be connected over a 10BASE-T Ethernet link, but may subsequently be connected to a faster 100BASE-TX link. In this situation, the line driver circuitry in the NIC must be capable of transmitting both 10BASE-T and 100BASE-TX Ethernet signals.

Figure 2:
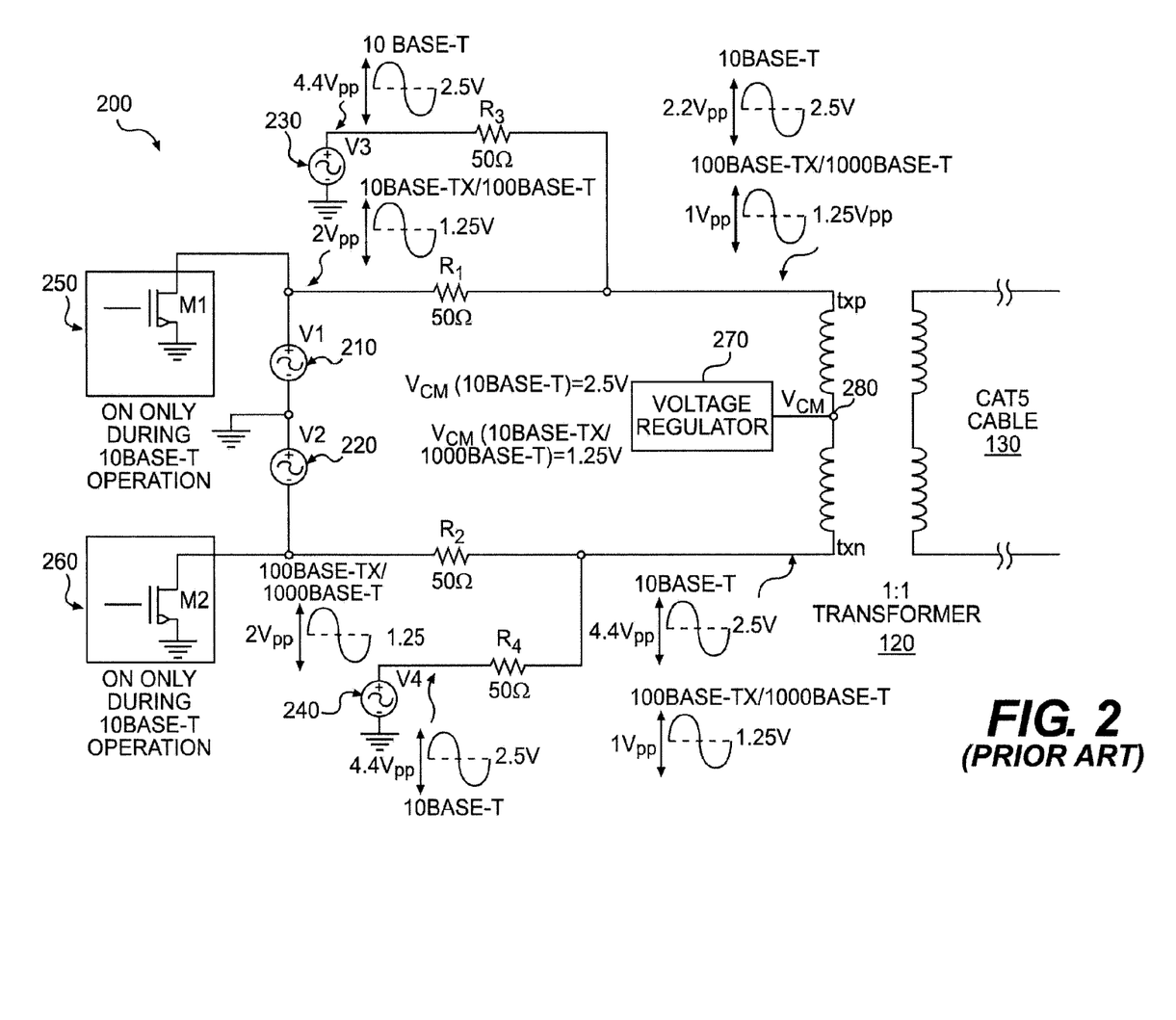
FIG. 2 illustrates an exemplary multimode Ethernet line driver circuit in the prior art.

FIG. 2 illustrates a conventional multimode Ethernet line driver circuit 200 configured for 10BASE-T and 100BASE-TX/1000BASE-T operations. Ethernet line driver circuit 200 includes voltage sources 210 and 220 for respectively outputting voltages V1 and V2 to generate differential 100BASE-TX and/or 1000BASE-T data signals. Ethernet line driver circuit 200 also includes a second set of voltage sources 230 and 240 for respectively outputting voltages V3 and V4 to generate differential 10BASE-T Ethernet signals. Ethernet line driver circuit 200 further includes a pair of switches 250 and 260 (e.g., n-channel FETs) and a voltage regulator 270 connected to a center tap 280 of transformer 120. Voltage regulator 270 provides a common mode voltage $V_{CM}$ at center tap 280.

During operation in 10BASE-T mode, switches 250 and 260 are turned on and essentially function as short circuits to ground (i.e., low impedances). Voltage sources 210 and 220 are turned off and act as open circuits (i.e., high impedances). Voltage sources 230 and 240 are turned on and provide 10BASE-T Ethernet signals of about 4.4V peak-to-peak. Voltage regulator 270 sets a common mode voltage $V_{CM}$ of about 2.5V at center tap 280. DC current flows from voltage regulator 270 to ground via resistors $R_1$ and $R_2$ (i.e., from center tap 280 to ground), causing voltage drops across resistors $R_1$ and $R_2$. As a result of the voltage drops, the common mode voltage of voltage sources 230 and 240 is reduced and the 10BASE-T Ethernet signals from voltage sources 230 and 240 are prevented from clipping. The voltage drops also result in positive and negative differential output voltages txp and txn of about 2.2 Vpp at the common mode voltage $V_{CM}$ (2.5V). Accordingly, a differential output signal (i.e., txp-txn) having an amplitude of about 4.4 Vpp and at the common mode voltage $V_{CM}$ (2.5V) is produced.

During operation in 100BASE-TX and 1000BASE-T modes, switches 250 and 260 are turned off and essentially function as electrical open circuits. Voltage sources 230 and 240 are also turned off and act as electrical open circuits. Voltage regulator 270 sets a common mode voltage $V_{CM}$ of about 1.25V at center tap 280. Voltage sources 210 and 220 are turned on and provide 100BASE-TX or 1000BASE-T Ethernet signals of about 2 Vpp. Because of the electrical open circuits created by turned-off switches 250 and 260 and turned-off voltage sources 230 and 240, no DC current can flow from voltage regulator 270 to ground. Accordingly, the 100BASE-TX or 1000BASE-T Ethernet signals provided by voltage sources 210 and 220 are centered at the common mode voltage $V_{CM}$ (1.25V). The voltage drops across resistors $R_1$ and $R_2$ result in positive and negative differential output voltages txp and txn of about 1 Vpp at the common mode voltage $V_{CM}$ (1.25V). Accordingly, a differential output signal (i.e., txp-txn) having an amplitude of about 2 Vpp and centered at the common mode voltage $V_{CM}$ (1.25V) is produced.

While Ethernet line driver circuit 200 is compatible with multiple Ethernet modes, it may have some disadvantages in certain applications. For example, two separate and independent driving circuits used respectively for the 10BASE-T mode and the 100BASE-TX and 1000BASE-T mode may add to the cost and complexity of Ethernet line driver circuit 200. In the example illustrated, Ethernet line driver circuit 200 includes essentially two output termination circuits comprising two termination resistors each. In addition, Ethernet line driver circuit 200 may be inefficient because DC current may sink to ground when operating in 10BASE-T mode, as described above. Accordingly, additional power may be consumed by resistors $R_1$ and $R_2$ during operation in 10BASE-T mode.

Therefore, it may be desirable to have a line driver circuit that, in certain applications, may overcome one or more of the disadvantages set forth above.

SUMMARY

One aspect is directed to a multimode line driver circuit. The line driver circuit may include a first voltage driver, connected to a first power supply voltage, outputting a first differential signal, and a second voltage driver, connected to a second power supply voltage, outputting a second differential signal. The line driver circuit may further include a transformer coupled to receive as input the first differential signal and the second differential signal and to output a differential line voltage signal based on the first differential signal and the second differential signal. The first power supply voltage may be greater than the second power supply voltage.

Another aspect is directed to a second multimode line driver circuit. The line driver circuit may include a first voltage driver outputting a first differential signal and a second voltage driver outputting a second differential signal. The line driver circuit may further include a transformer coupled to the first voltage driver to form a first turns ratio and coupled to the second voltage driver to form a second turns ratio. The transformer may receive as input the first differential signal and the second differential signal and output a differential line voltage signal based on the first differential signal and the second differential signal.

Yet another aspect is directed to a third multimode line driver circuit. The line driver circuit may include a first power supply having a first voltage, and a second power supply having a second voltage less than the first voltage. The line driver circuit may further include a first voltage driver, connected to the first power supply, outputting a first differential signal and a second voltage driver, connected to the second power supply, outputting a second differential signal. The line driver circuit may still further include a transformer coupled to receive as input the first differential signal and the second differential signal and to output a differential line voltage signal based on the first differential signal and the second differential signal, and a mode controller configured to couple the first voltage driver to the transformer in a first mode and to couple the second voltage driver to the transformer in the second mode.

DETAILED DESCRIPTION OF THE EMBODIMENTS

Reference will now be made in detail to embodiments of the disclosure, examples of which are illustrated in the accompanying drawings. Wherever possible, the same reference numbers will be used throughout the drawings to refer to the same or like parts.

Figure 3:
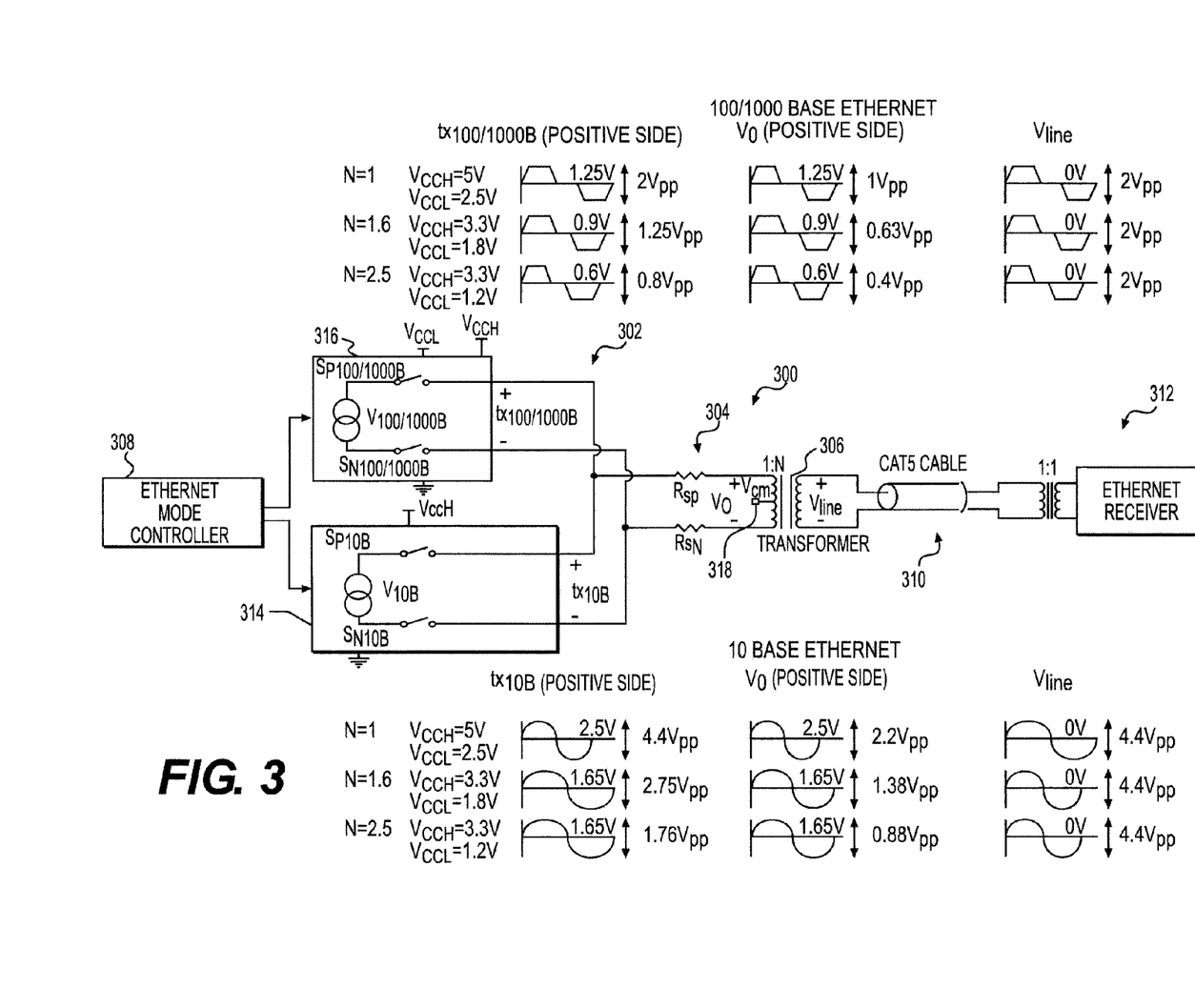
FIG. 3 illustrates an exemplary multimode Ethernet line driver circuit for a system having multiple power supply voltages.

Ethernet Line Driver Architecture for System with Multiple Power Supply Voltages FIG. 3 illustrates a multimode Ethernet line driver circuit 300 for a system having multiple power supply voltages, consistent with the disclosed embodiments. As described below, Ethernet line driver circuit 300 may take advantage of a system having multiple available on-chip power supply voltages to simplify the circuit design and reduce the number of components required. Accordingly, power consumption may be reduced. For example, Ethernet line driver circuit 300 may be incorporated into the transmitter side circuitry of a network interface card (NIC) having a high voltage power supply VccH (e.g., 5V or 3.3V) and a low voltage power supply VccL (e.g., 2.5V, 1.8V, or 1.2V).

As shown in FIG. 3, Ethernet line driver circuit 300 may include a voltage driver section 302, an output termination section 304, a transformer 306, and an Ethernet mode controller 308. Ethernet line driver circuit 300 may be configured to connect to a cable 310 via transformer 306 to communicate with an Ethernet receiver 312. In accordance with some embodiments, cable 310 may be a Category-5 cable.

Voltage driver section 302 may be coupled to output termination section 304, and may include a 10BASE-T mode voltage driver 314 and a 100BASE-TX/1000BASE-T mode voltage driver 316 for operating in the 10BASE-T and 100BASE-TX/1000BASE-T Ethernet modes, respectively. 10BASE-T mode voltage driver 314 may be coupled to high voltage power supply VccH and to output termination section 304 by way of switches $S_{P10B}$ and $S_{N10B}$. Switches $S_{P10B}$ and $S_{N10B}$ may include transistor switches (e.g., field effect transistors, bipolar junction transistors, etc.) or any other suitable electrical, mechanical, or electro-mechanical switches or circuits.

10BASE-T mode voltage driver 314 may further include a 10BASE-T Ethernet voltage source $V_{10B}$ configured to generate positive and negative out-of-phase voltage signals to provide an AC differential voltage signal $tx_{10B}$ for 10BASE-T Ethernet communication. 10BASE-T Ethernet voltage source $V_{10B}$ may include one or more operational amplifiers or any other components suitable for a voltage source. 10BASE-T mode voltage driver 314 may provide the AC differential voltage signal $tx_{10B}$ as input to output termination section 304 via switches $S_{P10B}$ and $S_{N10B}$ during 10BASE-T Ethernet mode operation.

100BASE-TX/1000BASE-T mode voltage driver 316 may be coupled to high voltage power supply VccH, to low voltage power supply VccL, and to output termination section 304 by way of switches $S_{P100/1000B}$ and $S_{N100/1000B}$. Switches $S_{P100/1000B}$ and $S_{N100/1000B}$ may include transistor switches (e.g., field effect transistors, bipolar junction transistors, etc.) or any other suitable electrical, mechanical, or electro-mechanical switches or circuits.

100BASE-TX/1000BASE-T mode voltage driver 316 may include a 100BASE-TX/1000BASE-T Ethernet voltage source $V_{100/1000B}$ configured to generate positive and negative out-of-phase voltage signals to provide an AC differential voltage signal $tx_{100/1000B}$ for 100BASE-TX/1000BASE-T Ethernet communication. 100BASE-TX/1000BASE-T Ethernet voltage source $V_{100/1000B}$ may include one or more operational amplifiers or any other components suitable for a voltage source. 100BASE-TX/1000BASE-T mode voltage driver 316 may provide the AC differential voltage signal $tx_{100/1000B}$ as input to output termination section 304 via switches $S_{P100/1000B}$ and $S_{N100/1000B}$ during 100BASE-TX/1000BASE-T Ethernet mode operation.

Output termination section 304 may include termination resistors $Rs_P$ and $Rs_N$. As shown in FIG. 3, the first ends of termination resistors $Rs_P$ and $Rs_N$ may be coupled to receive the AC differential voltage signals $tx_{10B}$ and $tx_{100/1000B}$ from voltage driver section 302. The second ends of termination resistors $Rs_P$ and $Rs_N$ may be coupled to provide a differential output voltage $V_O$ to transformer 306. The values of termination resistors $Rs_P$ and $Rs_N$ may be chosen to impedance-match cable 310 (e.g., 50Ω if cable 310 is a Category-5 cable). Accordingly, termination resistors $Rs_P$ and $Rs_N$ may function as a 50/50 voltage divider with Category-5 cable 310.

Transformer 306 may be coupled to receive differential output voltage $V_O$ as input from termination resistors $Rs_P$ and $Rs_N$. Transformer 306 may provide a voltage step (up or down) to differential output voltage $V_O$ to produce a differential line voltage $V_{line}$ for output on Category-5 cable 310 suitable for Ethernet communication. Consistent with the disclosed embodiments, the turns ratio 1:N of transformer 306 may be selected, based on the values of high voltage power supply VccH (e.g., 5 V or 3.3 V), on low voltage power supply VccL (e.g., 2.5 V, 1.8 V, or 1.2 V), and/or on differential voltage signals $tx_{10B}$ and $tx_{100/1000B}$, to provide a differential line voltage $V_{line}$ suitable for both 10BASE-T and 100BASE-TX/1000BASE-T Ethernet communication. That is, the turns ratio 1:N of transformer 306 may be selected to provide a differential line voltage $V_{line}$ of at least about 4.4 Vpp for 10BASE-T Ethernet communication and of about 2 Vpp for 100BASE-TX/1000BASE-T Ethernet communication. The manner in which the turns ratio 1:N of transformer 306 may be chosen will be discussed in further detail below.

Ethernet mode controller 308 may comprise any hardware and/or software components configured to switch Ethernet line driver circuit 300 between the 10BASE-T and 100BASE-TX/1000BASE-T Ethernet modes. Ethernet mode controller 308 may be coupled to, or otherwise in communication with, switches $S_{P10B}$, $S_{N10B}$, $S_{P100/1000B}$ and $S_{N100/1000B}$ and with voltage drivers 306 and 310. Ethernet mode controller 308 may also include or otherwise be associated with a voltage regulator circuit (not shown) configured to set a DC common mode voltage VCM at a center tap 318 of transformer 306 appropriate for 10BASE-T and 100BASE-TX/1000BASE-T Ethernet communication. For example, Ethernet mode controller 308 may set a DC common mode voltage of about 2.5 VDC during 10BASE-T mode operation and of about 1.25 VDC during 100BASE-TX/1000BASE-T mode operation.

During 10BASE-T Ethernet mode operation, Ethernet mode controller 308 may close switches $S_{P10B}$ and $S_{N10B}$ and may open switches $S_{P100/1000B}$ and $S_{N100/1000B}$. In addition, Ethernet mode controller 308 may power on 10BASE-T mode voltage driver 314 and may optionally power off 100BASE-TX/1000BASE-T mode voltage driver 316. Conversely, during 100BASE-TX/1000BASE-T mode operation, Ethernet mode controller 308 may open switches $S_{P10B}$ and $S_{N10B}$ and may close switches $S_{P100/1000B}$ and $S_{N100/1000B}$. In addition, Ethernet mode controller 308 may power on 100BASE-TX/1000BASE-T mode voltage driver 316 and may optionally power off 10BASE-T mode voltage driver 314.

Selection of Turns Ratio 1:N Where VccH=5 V and VccL=2.5 V

An example of selecting the turns ratio 1:N for transformer 306 in a case where high voltage power supply VccH=5 V and low voltage power supply VccL=2.5 V, consistent with the disclosed embodiments, will now be described. During 10BASE-T Ethernet mode operation, 10BASE-T Ethernet voltage source $V_{10B}$ may draw power from high voltage power supply VccH (5 V), and may be set to output an AC differential voltage signal $tx_{10B}$ of about 8.8 Vpp (e.g., based on two out-of-phase signals of about 4.4 Vpp each). The voltage drops across termination resistors $Rs_P$ and $Rs_N$ caused by the 50/50 voltage divider between termination resistors $Rs_P$ and $Rs_N$ and Category-5 Cable 310 may result in a differential output voltage signal $V_O$ of about 4.4 Vpp (e.g., based on two out-of-phase signals of about 2.2 Vpp each).

As indicated above, a 4.4 Vpp signal may be suitable for 10BASE-T Ethernet communication. Thus, transformer 306 may not need to provide a voltage step to convert differential output voltage signal $V_O$ to a differential line voltage signal $V_{line}$ suitable for 10BASE-T Ethernet communication on Category-5 cable 310. Accordingly, N may be chosen to be 1 to provide a 1:1 turns ratio for transformer 306.

Moreover, the chosen turns ratio of 1:1 for transformer 306 may also be suitable for 100BASE-TX/1000BASE-T Ethernet communication. For example, during 100BASE-TX/1000BASE-T Ethernet mode operation, 100BASE-TX/1000BASE-T Ethernet voltage source $V_{100/1000B}$ may draw power from low voltage power supply VccL (2.5 V), and may be set to output an AC differential voltage signal $tx_{100/1000B}$ of about 4 Vpp (e.g., based on two out-of-phase signals of about 2 Vpp each). The voltage drops across termination resistors $Rs_P$ and $Rs_N$ caused by the 50/50 voltage divider between termination resistors $Rs_P$ and $Rs_N$ and Category-5 Cable 310 may result in a differential output voltage signal $V_O$ of about 2 Vpp (e.g., based on two out-of-phase signals of about 1 Vpp each).

As indicated above, a 2 Vpp signal may be suitable for 100BASE-TX/1000BASE-T Ethernet communication. Thus, as in the case of 10BASE-T Ethernet communication, transformer 306 may not need to provide a voltage step to convert differential output voltage Vo to a differential line voltage signal $V_{line}$ appropriate for 100BASE-TX/1000BASE-T Ethernet communication on Category-5 cable 310. Accordingly, as in the case of 10BASE-T Ethernet communication, a turns ratio of 1:1 for transformer 306 may be appropriate.

Selection of Turns Ratio 1:N Where VccH=3.3 V and VccL=1.8 V

An example of selecting the turns ratio 1:N for transformer 306 in a case where high voltage power supply VccH=3.3 V and low voltage power supply VccL=1.8V, consistent with the disclosed embodiments, will now be described. During 10BASE-T Ethernet mode operation, 10BASE-T Ethernet voltage source $V_{10B}$ may draw power from high voltage power supply VccH (3.3 V), and may be set to output an AC differential voltage signal $tx_{10B}$ of about 5.5 Vpp (e.g., based on two out-of-phase signals of about 2.75 Vpp each).

The voltage drops across termination resistors $Rs_P$ and $Rs_N$ caused by the 50/50 voltage divider between termination resistors $Rs_P$ and $Rs_N$ and Category-5 Cable 310 may result in a differential output voltage Vo of about 2.75 Vpp (e.g., based on two out-of-phase signals of about 1.375 Vpp each).

As indicated above, a 4.4 Vpp signal may be suitable for 10BASE-T Ethernet communication. Thus, transformer 306 may need to provide a voltage step of a factor of about 1.6 (4.4/2.75) to convert the differential output voltage signal $V_O$ to a differential line voltage signal $V_{line}$ suitable for 10BASE-T Ethernet communication on Category-5 cable 310. Accordingly, N may be chosen to be 1.6 to provide a 1:1.6 turns ratio for transformer 306.

Moreover, the chosen turns ratio of 1:1.6 for transformer 306 may also be suitable for 100BASE-TX/1000BASE-T Ethernet communication. For example, during 100BASE-TX/1000BASE-T Ethernet mode operation, 100BASE-TX/1000BASE-T Ethernet voltage source $V_{100/1000B}$ may draw power from low voltage power supply VccL (1.8 V), and may be set to output an AC differential voltage signal $tx_{100/1000B}$ of about 2.5 Vpp (e.g., based on two out-of-phase signals of about 1.25 Vpp each). The voltage drops across termination resistors $Rs_P$ and $Rs_N$ caused by the 50/50 voltage divider between termination resistors $Rs_P$ and $Rs_N$ and Category-5 Cable 310 may result in a differential output voltage signal Vo of about 1.25 Vpp (e.g., based on two out-of-phase signals of about 0.625 Vpp each).

As indicated above, a 2 Vpp signal may be suitable for 100BASE-TX/1000BASE-T Ethernet communication. Thus, transformer 306 may need to provide a voltage step of a factor of about 1.6 (2.0/1.25) to convert the differential output voltage signal Vo to a differential line voltage signal $V_{line}$ appropriate for 100BASE-TX/1000BASE-T Ethernet communication on Category-5 cable 310. Accordingly, the chosen turns ratio of 1:1.6 for transformer 306 may also be suitable for 100BASE-TX/1000BASE-T Ethernet communication.

Selection of Turns Ratio 1:N Where VccH=3.3 V and VccL=1.2 V

An example of selecting the turns ratio 1:N for transformer 306 in a case where high voltage power supply VccH=3.3 V and low voltage power supply VccL=1.2V, consistent with the disclosed embodiments, will now be described. During 10BASE-T Ethernet mode operation, 10BASE-T Ethernet voltage source $V_{10B}$ may draw power from high voltage power supply VccH (3.3 V), and may be set to output an AC differential voltage signal $tx_{10B}$ of about 3.5 Vpp (e.g., based on two out-of-phase signals of about 1.76 Vpp each).

The voltage drops across termination resistors $Rs_P$ and $Rs_N$ caused by the 50/50 voltage divider between termination resistors $Rs_P$ and $Rs_N$ and Category-5 Cable 310 may result in a differential output voltage $V_O$ of about 1.76 Vpp (e.g., based on two out-of-phase signals of about 0.88 Vpp each).

As indicated above, a 4.4 Vpp signal may be suitable for 10BASE-T Ethernet communication. Thus, transformer 306 may need to provide a voltage step of a factor of about 2.5 (4.4/1.76) to convert the differential output voltage signal $V_O$ to a differential line voltage signal $V_{line}$ suitable for 10BASE-T Ethernet communication on Category-5 cable 310. Accordingly, N may be chosen to be 2.5 to provide a 1:2.5 turns ratio for transformer 306.

Moreover, the chosen turns ratio of 1:2.5 for transformer 306 may also be suitable for 100BASE-TX/1000BASE-T Ethernet communication. For example, during 100BASE-TX/1000BASE-T Ethernet mode operation, 100BASE-TX/1000BASE-T Ethernet voltage source $V_{100/1000B}$ may draw power from low voltage power supply VccL (1.8 V), and may be set to output an AC differential voltage signal $tx_{100/1000B}$ of about 1.6 Vpp (e.g., based on two out-of-phase signals of about 0.8 Vpp each). The voltage drops across termination resistors $Rs_P$ and $Rs_N$ caused by the 50/50 voltage divider between termination resistors $Rs_P$ and $Rs_N$ and Category-5 Cable 310 may result in a differential output voltage signal Vo of about 0.8 Vpp (e.g., based on two out-of-phase signals of about 0.4 Vpp each).

As indicated above, a 2 Vpp signal may be suitable for 100BASE-TX/1000BASE-T Ethernet communication. Thus, transformer 306 may need to provide a voltage step of a factor of about 2.5 (2.0/0.8) to convert the differential output voltage signal Vo to a differential line voltage signal $V_{line}$ appropriate for 100BASE-TX/1000BASE-T Ethernet communication on Category-5 cable 310. Accordingly, the chosen turns ratio of 1:2.7 for transformer 306 may also be suitable for 100BASE-TX/1000BASE-T Ethernet communication.

In this manner, the disclosed configuration may allow the number of required components for Ethernet line driver 300 to be reduced, as both 10BASE-T mode voltage driver 314 and 100BASE-TX/1000BASE-T mode voltage driver 316 may share a common output termination section 304 and transformer 306. A turns ratio 1:N for transformer 306 common to both Ethernet modes may be selected based on the available power supply voltages to provide a voltage step necessary to output a suitable differential line voltage signal $V_{line}$ signal on Category-5 cable 310.

Ethernet Line Driver Architecture for System with Single Power Supply Voltage

Figure 4:
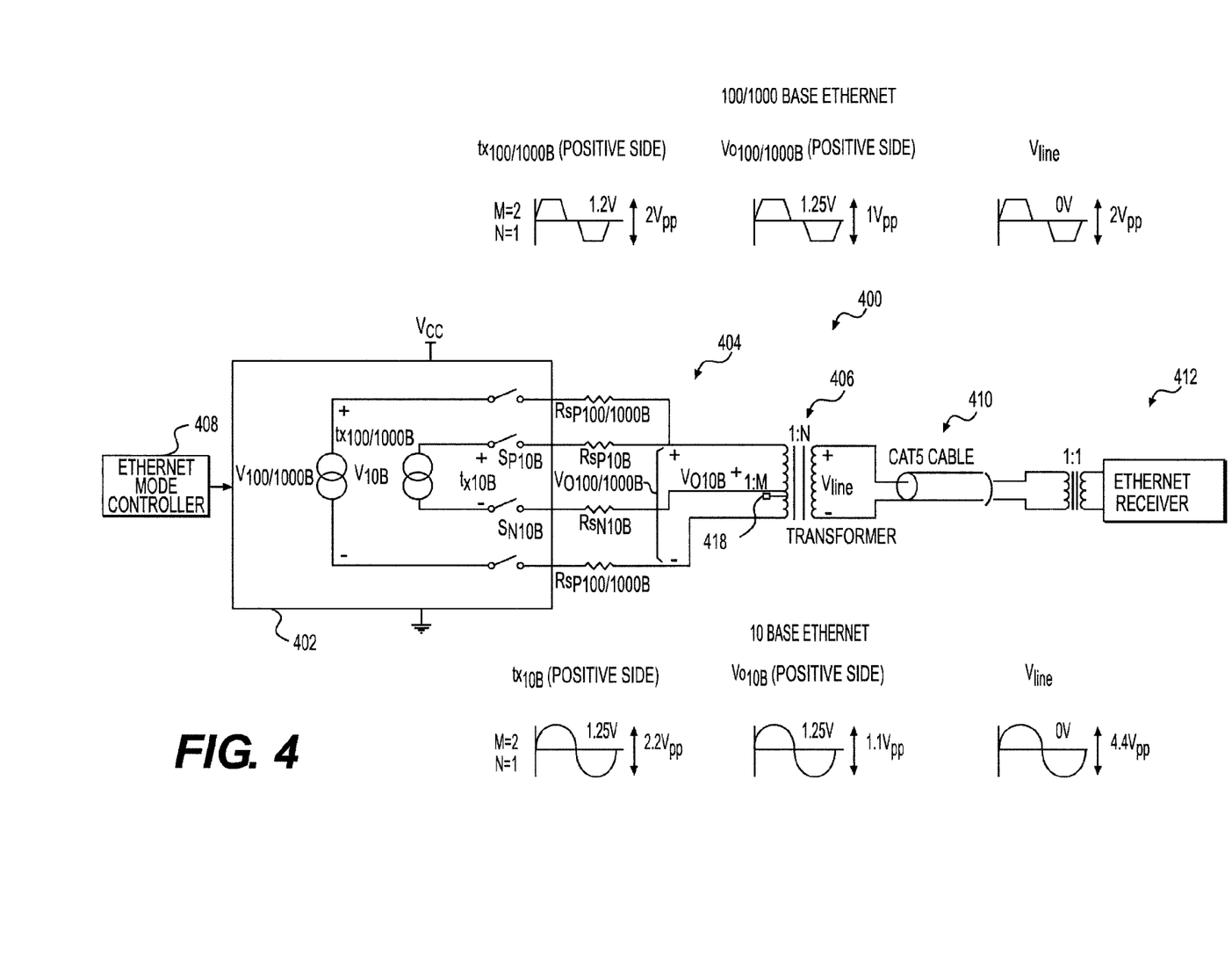
FIG. 4 illustrates an exemplary multimode Ethernet line driver circuit for a system having a single power supply voltage.

FIG. 4 illustrates a multimode Ethernet line driver circuit 400 for a system having a single power supply voltage Vcc (e.g., 5V or 3.3V), consistent with the disclosed embodiments. Ethernet line driver circuit 400 may be incorporated into the transmitter side circuitry of a network interface card (NIC). As shown in FIG. 4, Ethernet line driver circuit 400 may include a voltage driver section 402, an output termination section 404, a transformer 406, and an Ethernet mode controller 408. Ethernet line driver circuit 400 may be configured to connect to a cable 410, such as a Category-5 cable, via transformer 406 to communicate with an Ethernet receiver 412.

Voltage driver section 402 may be coupled to power supply voltage Vcc, and may include a 10BASE-T Ethernet mode voltage source $V_{10B}$ configured to generate positive and negative out-of-phase voltage signals to provide an AC differential voltage signal $tx_{10B}$ suitable for 10BASE-T Ethernet communication. 10BASE-T Ethernet mode voltage source $V_{10B}$ may be coupled to output termination section by way of switches $S_{P10B}$ and $S_{N10B}$. Voltage driver section 402 may also include a 100BASE-TX/1000BASE-T Ethernet mode voltage source $V_{100/1000B}$ configured to generate positive and negative out-of-phase voltage signals to provide an AC differential voltage signal $tx_{100/1000B}$ suitable for 100BASE-TX/1000BASE-T Ethernet communication. 100BASE-TX/1000BASE-T Ethernet mode voltage source $V_{100/1000B}$ may be coupled to output termination section by way of switches $S_{P100/1000B}$ and $S_{N100/1000B}$. Voltage sources $V_{10B}$ and $V_{100/1000B}$ may include one or more operational amplifiers or other components suitable for a voltage source. Switches $S_{P10B}$, $S_{N10B}$, $S_{P100/1000B}$, and $S_{N100/1000B}$ may include transistor switches (e.g., field effect transistors, bipolar junction transistors, etc.) or any other suitable electrical, mechanical, or electro-mechanical switches or circuits.

Output termination section 404 may include termination resistors $Rs_{N10B}$, $Rs_{P10B}$, $Rs_{P100/1000B}$, and $Rs_{N100/1000B}$. As shown in FIG. 4, the first ends of termination resistors $Rs_{N10B}$ and $Rs_{P10B}$ may be coupled to receive the AC differential voltage signal $tx_{10B}$ from voltage source $V_{10B}$ via switches $S_{P10B}$ and $S_{N10B}$. The second ends of termination resistors $Rs_{N10B}$ and $Rs_{P10B}$ may be coupled to provide a differential output voltage $Vo_{10B}$ to transformer 406. Moreover, as shown in FIG. 4, the second ends of termination resistors $Rs_{N10B}$ and $Rs_{P10B}$ may be coupled to transformer 406 at locations corresponding to a 1:M turns ratio.

Similarly, the first ends of termination resistors $Rs_{N100/1000B}$ and $Rs_{P100/1000B}$ may be coupled to receive the AC differential voltage signal $tx_{100/1000B}$ from voltage source $V_{100/1000B}$ via switches $S_{P100/1000B}$ and $S_{N100/1000B}$. The second ends of termination resistors $Rs_{N100/1000B}$ and $Rs_{P100/1000B}$ may be coupled to provide a differential output voltage $Vo_{100/1000B}$ to transformer 406. Moreover, as shown in FIG. 4, the second ends of termination resistors $Rs_{N100/1000B}$ and $Rs_{P100/1000B}$ may be coupled to transformer 406 at locations corresponding to a 1:N turns ratio.

The values of termination resistors $Rs_{N10B}$, $Rs_{P10B}$, $Rs_{N100/1000B}$, and $Rs_{P100/1000B}$ may be chosen to impedance-match Category-5 cable 410 (e.g., 50Ω). Accordingly, termination resistors $Rs_{N10B}$, $Rs_{10B}$, $Rs_{N100/1000B}$, and $Rs_{P100/1000B}$ may function as a 50/50 voltage divider with Category-5 cable 410.

Transformer 406 may be coupled to receive differential output voltage $Vo_{10B}$ as input from termination resistors $Rs_{P10B}$ and $Rs_{N10B}$, and to receive differential output voltage $Vo_{100/1000B}$ as input from termination resistors $Rs_{N100/1000B}$ and $Rs_{P100/1000B}$. In accordance with the two different turns ratios 1:M and 1:N, transformer 406 may provide two different voltage steps (up or down) to differential output voltages $Vo_{10B}$ and $Vo_{100/1000B}$ to produce a differential line voltage $V_{line}$ for output on Category-5 cable 410 suitable for Ethernet communication.

Consistent with the disclosed embodiments, the turns ratio 1:M of transformer 406 may be selected to provide a differential line voltage $V_{line}$ suitable for 10BASE-T Ethernet communication. That is, the turns ratio 1:M of transformer 406 may be selected to provide a differential line voltage $V_{line}$ of at least about 4.4 Vpp for 10BASE-T Ethernet communication. Similarly, the turns ratio 1:N of transformer 406 may be selected to provide a differential line voltage $V_{line}$ suitable for 100BASE-TX/1000BASE-T Ethernet communication. That is, the turns ratio 1:N of transformer 406 may be selected to provide a differential line voltage $V_{line}$ of about 2 Vpp for 10BASE-T 100BASE-TX/1000BASE-T Ethernet communication. The manner in which the turns ratios 1:M and 1:N of transformer 406 may be chosen will be discussed in further detail below.

Ethernet mode controller 408 may comprise any hardware and/or software components configured to switch Ethernet line driver circuit 400 between the 10BASE-T and 100BASE-TX/1000BASE-T Ethernet modes. Ethernet mode controller 408 may be coupled to, or otherwise in communication with, switches $SP_{10B}$, $S_{N10B}$, $S_{P100/1000B}$ and $S_{N100/1000B}$ and with voltage sources $V_{10B}$ and $V_{100/1000B}$. Ethernet mode controller 308 may also include or otherwise be associated with a voltage regulator circuit (not shown) configured to set a DC common mode voltage VCM at a center tap 318 of transformer 306 appropriate for 10BASE-T and 100BASE-TX/1000BASE-T Ethernet communication. For example, Ethernet mode controller 308 may set a DC common mode voltage of about 2.5 VDC during 10BASE-T mode operation and of about 1.25 VDC during 100BASE-TX/1000BASE-T mode operation.

During 10BASE-T Ethernet mode operation, Ethernet mode controller 408 may close switches $S_{P10B}$ and $S_{N10B}$ and may open switches $S_{P100/1000B}$ and $S_{N100/1000B}$. In addition, Ethernet mode controller 408 may power on 10BASE-T voltage source $V_{10B}$ may optionally power off 100BASE-TX/1000BASE-T voltage source $V_{100/1000B}$. Conversely, during 100BASE-TX/1000BASE-T mode operation, Ethernet mode controller 408 may open switches $S_{P10B}$ and $S_{N10B}$ and may close switches $S_{P100/1000B}$ and $S_{N100/1000B}$. In addition, Ethernet mode controller 408 may power on 100BASE-TX/1000BASE-T voltage source $V_{100/1000B}$ and may optionally power off 10BASE-T voltage source $V_{10B}$.

Selection of Turns Ratios 1:M and 1:N

An example of selecting the turns ratios 1:M and 1:N for transformer 406 in a case where power supply Vcc=5 V, consistent with the disclosed embodiments, will now be described. During 10BASE-T Ethernet mode operation, 10BASE-T Ethernet voltage source $V_{10B}$ may draw power from power supply Vcc (5 V), and may be set to output an AC differential voltage signal $tx_{10B}$ of about 4.4 Vpp (e.g., based on two out-of-phase signals of about 2.2 Vpp each).

The voltage drops across termination resistors $Rs_{P10B}$ and $Rs_{N10B}$ caused by the 50/50 voltage divider between termination resistors $Rs_{P10B}$ and $Rs_{N10B}$ and Category-5 Cable 410 may result in a differential output voltage $Vo_{10B}$ of about 2.2 Vpp (e.g., based on two out-of-phase signals of about 1.1 Vpp each).

As indicated above, a 4.4 Vpp signal may be suitable for 10BASE-T Ethernet communication. Thus, transformer 406 may need to provide a voltage step of a factor of about 2.0 (4.4/2.2 Vpp) to convert the differential output voltage signal $Vo_{10B}$ to a differential line voltage signal $V_{line}$ suitable for 10BASE-T Ethernet communication on Category-5 cable 410. Accordingly, M may be chosen to be 2 to provide a first turns 1:M ratio of 1:2 for transformer 406.

During 100BASE-TX/1000BASE-T Ethernet mode operation, 100BASE-DU1000BASE-T Ethernet voltage source $V_{100/1000B}$ may draw power from power supply Vcc (5

V), and may be set to output an AC differential voltage signal $tx_{10B}$ of about 4 Vpp (e.g., based on two out-of-phase signals of about 2 Vpp each).

The voltage drops across termination resistors $Rs_{P100/1000B}$ and $Rs_{N100/1000B}$ caused by the 50/50 voltage divider between termination resistors $Rs_{P100/1000B}$ and $Rs_{N100/1000B}$ and Category-5 Cable 410 may result in a differential output voltage $Vo_{100/1000B}$ of about 2 Vpp (e.g., based on two out-of-phase signals of about 1 Vpp each).

As indicated above, a 2 Vpp signal may be suitable for 100BASE-TX/1000BASE-T Ethernet communication. Thus, transformer 406 may not need to provide any voltage step to convert the differential output voltage signal $Vo_{100/1000B}$ to a differential line voltage signal $V_{line}$ suitable for 100BASE-TX/1000BASE-T Ethernet communication on Category-5 cable 410 (i.e., a voltage step factor of 1). Accordingly, N may be chosen to be 1 to provide a second turns 1:N ratio of 1:2 for transformer 406.

In this manner, the disclosed configuration may allow the number of required components for Ethernet line driver 400 to be reduced, as both 10BASE-T voltage source $V_{10B}$ and 100BASE-TX/1000BASE-T voltage source $V_{100/1000B}$ may share a common output termination section 404 and transformer 406. Moreover, coupling the 10BASE-T portion of output termination section 404 to transformer 406 at a first position corresponding to a first turns ratio 1:M and the 100BASE-TX/1000BASE-T portion of output termination section 404 to transformer 406 at a second position corresponding to a second turns ratio 1:N, M and N may be selected to provide suitable voltage steps for communicating using both Ethernet modes.

The foregoing includes descriptions of exemplary embodiments. Other possible embodiments will be apparent to those skilled in the art from consideration of the specification and practice of the invention disclosed herein. For example, although the disclosed embodiments have been described with reference to multimode line driver circuitry for Ethernet modes, those skilled in the art will appreciate that the disclosed circuit configurations may be used and/or appropriately modified to transmit multiple modes in network communication protocols other than Ethernet. Further, while the disclosure discusses primarily the 10BASE-T, the 100BASE-TX, and 1000BASE-T Ethernet modes, it will be apparent that other combinations of Ethernet modes, such as those set forth in IEEE Standard 802.3 or other communication protocols, may be employed in accordance with the disclosed embodiments.

In addition, the values of the various power supply voltages (e.g., VccH, VccL, and Vcc), peak-to-peak voltage signals, output signals, etc. described above are intended to be exemplary and for purposes of illustration only. These values may vary depending upon the particular implementation, and the turns ratios for transformers 306 and 406 may be chosen accordingly to provide suitable output voltages for any communication scheme. Thus, it is contemplated that the disclosed embodiments may be applied to line drivers having any particular power supply voltages, peak-to-peak voltage signals, output signal requirements, etc.

Additionally, various circuit components in the disclosed embodiments can be replaced with their functional equivalents. For example, the various circuit elements of disclosed embodiments are broadly understood to include any hardware circuit, or combination of hardware and appropriately-programmed software. Moreover, other types of physical transmission media may be substituted for the exemplary Category-5 cables. Thus, the resistance values of the representative 50 ohm termination and input resistors may be adjusted depending on the impedance of the particular physical medium selected.

Although the disclosed embodiments are primarily disclosed as implemented in hardware, it is expressly contemplated that at least portions of the disclosure can be implemented by way of software. For example, a computer-readable storage medium may store program instructions that, when executed by a computing device, cause the computing device to perform the disclosed processes. Those skilled in the art will understand that the computer-readable medium may include, for example, random access memory (RAM), read-only memory (ROM), optical or magnetic storage devices (e.g., a CD-ROM, DVD-ROM, a hard drive, a solid-state memory drive, etc.), and/or any other type of computer-readable storage device known in the art. Those skilled in the art will also understand that at least portions of the disclosure can be implemented by way of a computing device executing software, hardware, firmware, or combinations thereof. Accordingly, it is intended that this specification and its disclosed embodiments be considered as exemplary only, with a true scope and spirit of the invention being indicated by the following claims.

What is claimed is:

1. A multimode line driver circuit, comprising:
    a first voltage driver, connected to a first power supply voltage and outputting a first differential signal;
    a second voltage driver, connected to a second power supply voltage and outputting a second differential signal; and
    a transformer coupled to receive as input the first differential signal and the second differential signal and to output a differential line voltage signal based on the first differential signal and the second differential signal,
    wherein the first power supply voltage is greater than the second power supply voltage.

2. The multimode line driver circuit of claim 1, further comprising a mode controller configured to couple the first voltage driver to the transformer in a first communication mode, and to couple the second voltage driver to the transformer in a second communication mode.

3. The multimode line driver circuit of claim 2, further comprising:
    a first switch for coupling the first voltage driver to the transformer; and
    a second switch for coupling the second voltage driver to the transformer,
    wherein the mode controller couples the first voltage driver to the transformer by closing the first switch and couples the second voltage driver to the transformer by closing the second switch.

4. The multimode line driver circuit of claim 2, wherein the transformer has a turns ratio selected based at least on a desired peak-to-peak voltage of the differential line voltage signal for the first communication mode and on a desired peak-to-peak voltage of the differential line voltage signal for the second communication mode.

5. The multimode line driver circuit according to claim 2, wherein the first mode is 10BASE-T Ethernet and the second mode is 100BASE-TX Ethernet or 1000BASE-T Ethernet.

6. The multimode line driver circuit according to claim 1, further comprising an output interface for coupling the differential line voltage signal to a cable.

7. The multimode line driver circuit according to claim 6, further comprising an output termination section including at least one a termination resistor coupling the first and second voltage drivers to the transformer.

8. The multimode line driver circuit according to claim 6, wherein the cable is an Ethernet cable.

9. A multimode line driver circuit, comprising:
a first voltage driver outputting a first differential signal;
a second voltage driver outputting a second differential signal; and
a transformer coupled to the first voltage driver to form a first turns ratio (1:M) and coupled to the second voltage driver to form a second turns ratio (1:N), the transformer receiving as input the first differential signal and the second differential signal and outputting a differential line voltage signal based on the first differential signal and the second differential signal.

10. The multimode line driver circuit of claim 9, further comprising a mode controller configured to couple the first voltage driver to the transformer in a first communication mode, and to couple the second voltage driver to the transformer in a second communication mode.

11. The multimode line driver circuit of claim 10, further comprising:
a first switch for coupling the first voltage driver to the transformer; and
a second switch for coupling the second voltage driver to the transformer,
wherein the mode controller couples the first voltage driver to the transformer by closing the first switch and couples the second voltage driver to the transformer by closing the second switch.

12. The multimode line driver circuit of claim 10, wherein the first turns ratio is selected based at least on a desired peak-to-peak voltage of the differential line voltage signal for the first communication mode, and the second turns ratio is selected based on a desired peak-to-peak voltage of the differential line voltage signal for the second communication mode.

13. The multimode line driver circuit according to claim 10, wherein the first mode is 10BASE-T Ethernet and the second mode is 100BASE-TX Ethernet or 1000BASE-T Ethernet.

14. The multimode line driver circuit according to claim 13, wherein M is greater than N.

15. The multimode line driver circuit according to claim 9, further comprising an output interface for coupling the differential line voltage signal to a cable.

16. The multimode line driver circuit according to claim 15, further comprising an output termination section including at least one a termination resistor coupling the first and second voltage drivers to the transformer.

17. The multimode line driver circuit according to claim 15, wherein the cable is an Ethernet cable.

18. The multimode line driver circuit according to claim 9, wherein the first and second voltage drivers are connected to the same power supply voltage.

19. A multimode line driver circuit, comprising:
a first power supply having a first voltage;
a second power supply having a second voltage less than the first voltage;
a first voltage driver, connected to the first power supply and outputting a first differential signal;
a second voltage driver, connected to the second power supply and outputting a second differential signal;
a transformer coupled to receive as input the first differential signal and the second differential signal and to output a differential line voltage signal based on the first differential signal and the second differential signal;
a mode controller configured to couple the first voltage driver to the transformer in a first mode, and to couple the second voltage driver to the transformer.

20. The multimode line driver circuit of claim 19, further comprising:
a first switch for coupling the first voltage driver to the transformer; and
a second switch for coupling the second voltage driver to the transformer,
wherein the mode controller couples the first voltage driver to the transformer by closing the first switch and couples the second voltage driver to the transformer by closing the second switch.

* * * * *